No. 718,150. PATENTED JAN. 13, 1903.
B. F. PERRY.
BAYONET.
APPLICATION FILED JULY 12, 1902.
NO MODEL.
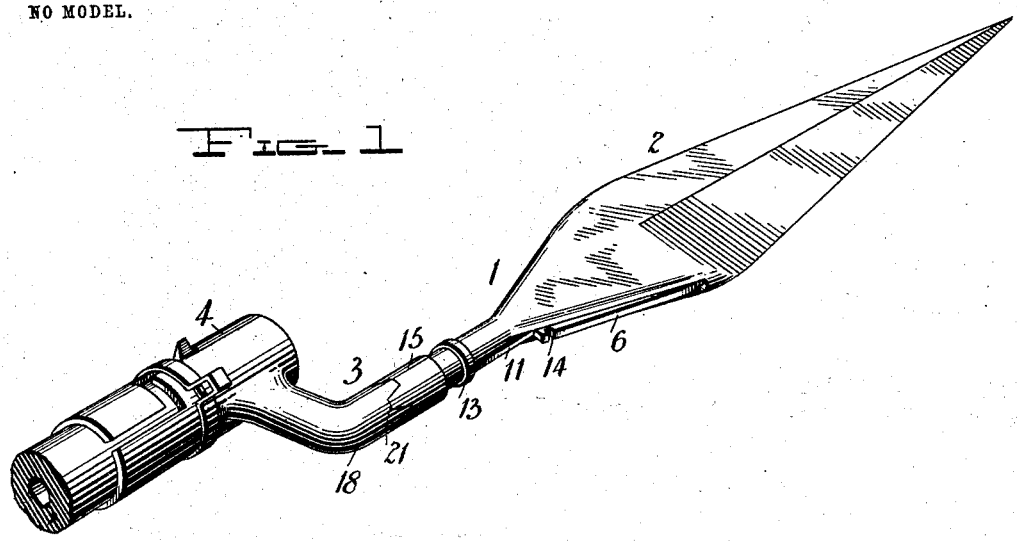
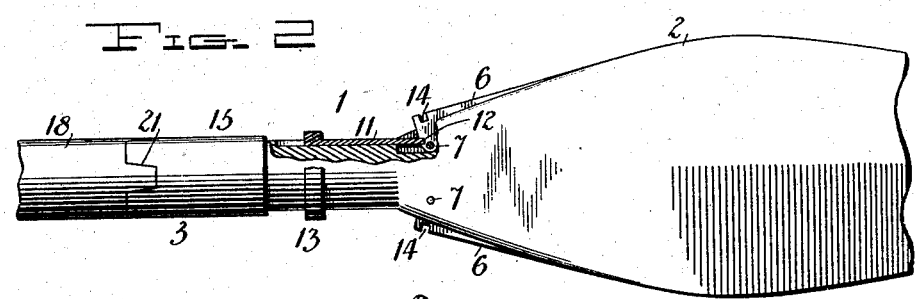
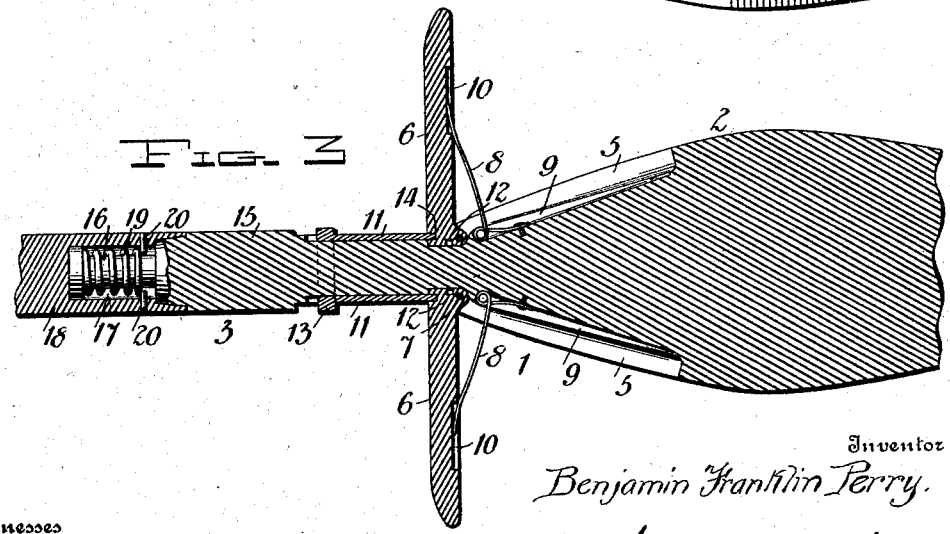
Inventor
Benjamin Franklin Perry.
Witnesses
By W. W. Dudley & Co.
his Attorneys

UNITED STATES PATENT OFFICE.

BENJAMIN FRANKLIN PERRY, OF GRAND JUNCTION, COLORADO, ASSIGNOR OF THREE-FOURTHS TO FIDELIA LILLIE PERRY AND ASA BYRON PERRY, OF GRAND JUNCTION, COLORADO.

BAYONET.

SPECIFICATION forming part of Letters Patent No. 718,150, dated January 13, 1903.

Application filed July 12, 1902. Serial No. 115,343. (No model.)

*To all whom it may concern:*

Be it known that I, BENJAMIN FRANKLIN PERRY, a citizen of the United States, residing at Grand Junction, in the county of Mesa and State of Colorado, have invented certain new and useful Improvements in Bayonets; and I do hereby declare the following to be a full, clear, and exact description of the invention, such as will enable others skilled in the art to which it appertains to make and use the same.

My invention relates to bayonets for firearms, and has for its object the production of a device of this character adapted for alternate use as a bayonet and as a short sword or dagger, the device to this end being equipped with means for its removable attachment to a gun-barrel and with hand-guards arranged to be folded when the device is used as a bayonet and to be extended when employed as a short sword or dagger.

Other features possessed by my invention are set forth in the following detailed description, which is to be read in connection with the accompanying drawings, illustrating my invention in its preferred form, although it must be understood that various modifications may be made without departing from the spirit of my invention as defined by the claims.

In the drawings, Figure 1 is a perspective view of a bayonet embodying my invention. Fig. 2 is an enlarged elevation, partly broken away. Fig. 3 is a vertical sectional view showing the guards in extended position.

Referring to the drawings by numerals, 1 denotes the bayonet, having a blade 2, preferably of the form shown, a shank 3, joined by a right-angle portion to the sleeve 4, and any suitable means carried by the sleeve for fixing the bayonet to the barrel of the firearm. The blade is provided toward its inner end with recesses 5 5, forming seats for foldable hand-guards 6 6, pivoted by pins 7 at the junction of the blade and shank. The guards are folded against the action of springs 8 8, each secured at one end in a groove 9, central of the recess 5, and confined at its other end in a groove 10 in the guard to prevent displacement. The folded position of the guards is maintained by the engagement of bolts 11 11 with notches 12 12, provided in the inner ends of the guards, as shown in Figs. 2 and 3, the bolts being fixed to and carried by a ring 13, encircling the shank and serving as a handhold to move the bolts. Movement of the ring and bolts to the left effects the release of the guards, and the springs act automatically to press the guards to the extended position illustrated in Fig. 3. Such extended position is maintained both by the action of the springs and the engagement of the bolts with other notches 14 14 in the outer side of the guards, the bolts being moved to the right for this purpose, as shown in Fig. 3.

The bayonet being unfixed and the guards extended, it may be effectively used as a dagger or short sword, the guards protecting the hand against injury, inasmuch as they are firmly held against movement. It will be understood by reference to Figs. 1 and 2 that the guards are folded when the device is used as a bayonet, and it will be further noted that when in folded position the guards are practically concealed from view.

As it may be necessary to turn the blade to an angle different from that shown, the shank is made in two parts, one of which, 15, has a reduced shouldered end 16, slidably engaging a recess 17 in the other part 18. A spring 19, coiled around the end 16 and interposed between the shoulder and pins 20, extending into the recess, acts to press the parts together. The meeting ends of the parts 15 and 18 are provided with interlocking teeth, as shown at 21, and by separating the parts against the action of the spring and turning one of them the blade may be caused to assume any desired angle with reference to the right-angle portion of the shank. This construction is especially desirable if the unfixed bayonet is to be carried in a sheath suspended from the belt, in which event the parts would be adjusted as shown in Fig. 1, whereas if the fixed bayonet is to be used for making intrenchments or for other purposes a different angle for the blade is necessary.

The bayonet is of simple construction and possesses durability and is very efficient in operation. The parts are constructed and assembled in a manner to insure strength and rigidity.

I claim as my invention—

1. A bayonet having foldable hand-guards, and means for locking the guards in folded and extended positions.

2. A bayonet having pivoted hand-guards, springs for automatically extending the guards, and means for locking the guards in folded and extended positions.

3. A bayonet having foldable hand-guards, and a shank formed in two separable interlocking parts for changing the angle of the blade.

4. A bayonet having a blade provided with recesses, hand-guards pivoted to fold in said recesses, means for locking the folded guards, and springs for automatically extending the guards when released.

5. A bayonet having foldable hand-guards, and slidable bolts on the shank adapted to engage notches in the guards for locking them in folded position, and to engage other notches in the guards for locking them in extended position.

6. A bayonet having foldable hand-guards having notches in the ends and sides, springs acting to extend the guards, and bolts carried by a ring and slidable in recesses in the bayonet-shank to engage the end notches to lock the guards in folded position, and to engage the side notches to lock the extended guards.

In testimony whereof I affix my signature in presence of two witnesses.

BENJAMIN FRANKLIN PERRY.

Witnesses:
W. T. NORTON,
F. L. BROWNE.